US010429538B1

United States Patent
Venezia et al.

(10) Patent No.: US 10,429,538 B1
(45) Date of Patent: Oct. 1, 2019

(54) UNDERWATER ELECTROMAGNETIC FIELD MEASUREMENT THAT FACTORS IN OCEAN DYNAMICS

(71) Applicants: William A. Venezia, Stuart, FL (US); John J. Holmes, Columbia, MD (US); Eric S. Dykes, Loxahatchee, FL (US)

(72) Inventors: William A. Venezia, Stuart, FL (US); John J. Holmes, Columbia, MD (US); Eric S. Dykes, Loxahatchee, FL (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 38 days.

(21) Appl. No.: 15/203,593

(22) Filed: Jul. 6, 2016

Related U.S. Application Data

(60) Provisional application No. 62/189,030, filed on Jul. 6, 2015.

(51) Int. Cl.
*G01V 3/38* (2006.01)
*G01V 3/08* (2006.01)

(52) U.S. Cl.
CPC ............. *G01V 3/38* (2013.01); *G01V 3/081* (2013.01)

(58) Field of Classification Search
CPC ....... G01V 3/00; G01C 17/38; G01C 19/5698
See application file for complete search history.

(56) References Cited

U.S. PATENT DOCUMENTS 8,786,277 B2  7/2014  Webb
2011/0077889 A1*  3/2011  Vogt ...................... G01C 17/38
                                                                   702/93

OTHER PUBLICATIONS

Avera et al., "Magnetic Noise Associated with Ocean Internal Waves", 2009, pp. 1-4.*
D. C. Fraser, "The Magnetic Fields of Ocean Waves," Geophysical Journal of the Royal Astronomical Society, vol. 11, Issue 5, pp. 507-517 (Jan. 1966).

(Continued)

*Primary Examiner* — Mohamed Charioui
*Assistant Examiner* — Eyob Hagos
(74) *Attorney, Agent, or Firm* — Howard Kaiser

(57) ABSTRACT

According to exemplary inventive practice, an ADCP system (including one or more acoustic Doppler current profilers) and a magnetometer system (including one or more magnetometers) are placed underwater. The ADCP system is used to obtain ADCP time series data. The magnetometer system is used to obtain magnetometer time series data. A computer performs computations with respect to input from the ADCP system and input from the magnetometer system. The computations include formulation of a least squares matrix to minimize a least squared error between the ADCP time series data and the magnetometer time series data. The present invention may be practiced, for instance, whereby a magnetometer is centrally located in relation to a triangular arrangement of three ADCPs, or whereby the ADCP system and the magnetometer system are co-located.

13 Claims, 8 Drawing Sheets

(56) References Cited

OTHER PUBLICATIONS

Walter Podney, "Electromagnetic Fields Generated by Ocean Waves," Final Technical Report, RADC-TR-74-285, dated Aug. 1974, contractor Physical Dynamics, Incorporated, prepared for Rome Air Development Center, Defense Advanced Research Projects Agency, ARPA Order No. 1649, contract No. F30602-72-C-0495, distributed by National Technical Information Service (NTIS), U.S. Department of Commerce, Springfield, Virginia.
Alan D. Chave, "On the Electromagnetic Fields Induced by Oceanic Internal Waves," Journal of Geophysical Research, vol. 89, No. C6, pp. 10,519-10,528,American Geophysical Union, Paper No. 4C0893 (Nov. 20, 1984).

\* cited by examiner

UNDERWATER ELECTROMAGNETIC FIELD MEASUREMENT THAT FACTORS IN OCEAN DYNAMICS

CROSS-REFERENCE TO RELATED APPLICATIONS

This application claims the benefit of U.S. provisional application No. 62/189,030, filed 6 Jul. 2015, hereby incorporated herein by reference, entitled "Coastal Mixing and Magnetics Project," inventors William A. Venezia, John J. Holmes, and Eric S. Dykes.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to oceanographic phenomena, more particularly to the relation underwater between electromagnetic fields and ocean water dynamics.

Understanding the characteristics of naturally occurring underwater electromagnetic fields and their relationship to physical oceanographic properties within a coastal environment is important to the study of oceanography and related engineering disciplines. Ocean dynamics appear as variable magnetic anomalies that change on the scale of the ocean features they denote.

The motion of the electrically conductive water through the earth's magnetic field causes an important source of extremely low frequency electromagnetic (EM) variations in the ocean. Movement of seawater in the earth's magnetic field produces an electromotive force with an associated electric current and magnetic field. As a result, surface waves, internal waves, solitary waves, tides, and ocean currents all produce observable magnetic and electric fields.

These kinematic ocean features contribute to the magnetic field that magnetic sensors observe when measuring the field in or over ocean areas. As a result, the ocean dynamics appear as variable magnetic anomalies that change on the scale of the ocean features they represent. For stationary magnetic sensors like those deployed on the bottom of the seafloor, the ocean dynamics should appear as periods of increased magnetic background noise. For airborne magnetic sensors traveling across a segment of ocean, the ocean dynamics should appear as non-stationary anomalies that move or change with time.

Early studies of magnetic and electric fields generated by ocean flow were concerned with electric fields induced by the steady motion of seawater. Internal waves have been observed with magnetic sensors in the deep ocean and are routinely characterized by measuring the electric and thermal structure using in-water sensors.

Theoretical models for internal wave induced magnetic spectra indicate that the amplitude increases with decreasing frequency, and predictions of the influence on magnetic surveys have been calculated based on these models. A model was developed for the induced magnetic field from internal waves in a two-layered ocean. A more comprehensive treatment of internal waves followed for an exponentially stratified ocean with a horizontally uniform Brunt-Vaisala frequency profile. Subsequently a spectral estimate was generated of the magnetic induction. A somewhat more general solution was derived for internal waves that also used the wave spectra and presented predictions of the magnetic power spectra above and below the water surface.

Further understanding is desired of the extent to which direct measurement of ocean dynamics can reduce electromagnetic sensor noise. In particular, it would be beneficial to be capable of quantifying oceanographic dynamic influence on electromagnetic fields so as to compensate the resultant noise in electromagnetic field measurement, especially in coastal regions.

The following reference is pertinent to the instant disclosure and is incorporated herein by reference: W. E. Avera, Patrick C. Gallacher, and W. J. Teague, "Magnetic Noise Associated with Ocean Internal Waves," IEEE, Oceans, 2009, 26-29 Oct. 2009. See also the following references that are pertinent to the instant disclosure: M. S. Longuet-Higgins, M. E. Stern, and H. Stommel, "The Electric Field Induced by Ocean Currents and Waves, with Applications to the Method of Towed Electrodes," *Papers in Physical Oceanography and Meteorology* XIII, I, Massachusetts Institute of Technology and Woods Hole Oceanographic Institution, 1954; H. T. Beal and J. T. Weaver. "Calculations of Magnetic Variations Induced by Internal Ocean Waves," *J. Geophys. Res.*, vol. 75, no. 33, 1970; W. Podney, "Electromagnetic Fields Generated by Ocean Waves," *J. Geophys. Res.*, vol. 80, no. 21, 1975; R. A. Petersen and K. A. Poehls, "Model Spectrum of Magnetic Induction Caused by Ambient Internal Waves," *J. Geophys. Res.*, vol. 87, no. C I, pp 433-440, 1982; C. Garrett and W. Munk, "Space-time Scales of Internal Waves,"*J. Geophys. Fluid Dynamics*, vol. 2, pp. 225-264, 1972; A. D. Chave, "On the Electromagnetic Field Induced by Ocean Internal Waves," *J. Geophys. Res.*, vol. 89, no. C6, pp 10519-10528, 1984; W. E. Avera, "Influence of Internal Wave Ocean Dynamics on Magnetic Surveys," MARELEC 2009 Conference, Stockholm Sweden, Jul. 7-9, 2009; W. A. Venezia, et al., "Successful Navy and Academic Partnership Providing Sustained Ocean Observation Capabilities in the Florida Straits," *Marine Technology Society Journal*, vol. 37, no. 3, pp 81-91, Fall 2003; W. A. Venezia, "Buoy Systems to Augment a Narrow Continental Shelf Cabled Ocean Observatory," in ONR/MTS Buoy Workshop, Monterey, Calif., March 2010; C. Bradley and W. A. Venezia, "Spar Buoy Platform for Water Wave, Turbulence and Underwater Electric Field Sensors," Proceedings of the IEEE/OES/CWTM Tenth Working Conference on Current Measurement Technology, April 2011; M. Dhanak, W. Venezia, E. An, R. Couson, J. Frankenfield, and K. von Ellenrieder, "Magnetic Field Surveys of Coastal Waters Using an AUV-towed Magnetometer," Oceans, 2013; A. Soloviev, M. Silvia, W. Avera, "Analysis of the Electromagnetic Signatures of Fine-Scale Oceanographic Features," MARELEC, 2013, Hamburg, Germany, 16-19 Jul. 2013; W. Avera, J. Bradley Nelson, and W. J. Teague, "Comparison of In-Water Predicted and Measured Magnetic Fields Due to Ocean Dynamics," MARELEC 2011, San Diego Calif., 20-23 Jun. 2011; J. Bradley Nelson and W. Avera, "Comparison of Ocean-Generated Magnetic Fields Measurements in Air and Water versus Predicted from Ocean Circulation Models," MARELEC 2013, Hamburg, Germany, 16-19 Jul. 2013; J. N. Moum, and W. D. Smyth, "The Pressure Disturbance of a Nonlinear Internal Wave Train," *J. Fluid Mech.* 2006, vol. 558, pp 153177; A. R. Osborne, *Nonlinear Ocean Waves and the Inverse Scattering Transform*, 1st ed. Burlington: Academic Press, 2010; J.

Clerk Maxwell, *A Treatise on Electricity and Magnetism,* 3rd ed., vol. 2, Oxford: Clarendon, 1892, pp 68-73.

SUMMARY OF THE INVENTION

In view of the foregoing, an object of the present invention is to provide an improved methodology for conducting measurements of underwater electromagnetic fields (such as by using one or more magnetometers) so as to compensate for the degree of electromagnetic noise that is attributable to underwater oceanographic dynamics (such as involving ocean waves, currents, and velocities).

According to exemplary practice of the present invention, an inventive apparatus for measuring underwater electromagnetic phenomena includes at least one acoustic Doppler current profiler (ADCP), at least one magnetometer, and a computer. The computer has computer code characterized by computer program logic for enabling the computer to process underwater electromagnetic field measurement (i.e., one or more measurements). The computer code is executable by the computer so that, in accordance with the computer program logic, the computer performs acts including: (a) inputting measurement data received from the at least one acoustic Doppler current profiler; (b) inputting measurement data received from the at least one magnetometer; (c) producing ADCP time series data, the producing of the ADCP time series data including using the measurement data received from the at least one acoustic Doppler current profiler; (d) producing magnetometer time series data, the producing of the magnetometer time series data including using the measurement data received from the at least one magnetometer; and, (e) performing a least squares calculation, wherein a least squares matrix minimizes a least squared error between the ADCP time series data and the magnetometer time series data.

According to one exemplary embodiment of the present invention, at least three acoustic Doppler current profilers are arranged in a triangular configuration, and the at least one magnetometer is situated approximately centrally with respect to the at least three acoustic Doppler current profilers. According to another exemplary embodiment of the present invention, the at least three acoustic Doppler current profilers and the at least one magnetometer are co-located.

The instant disclosure focuses in particular on magnetic fields produced by internal ocean dynamics in the frequency band from 0.1 to 0.0001 hertz (Hz). Some initial magnetic observations are presented herein to characterize the magnetic fields associated with internal waves. This band is chosen by the present inventors because the Power Spectral Densities (PSD) of the undersea magnetometer are very similar to the two onshore magnetometers over this range of frequencies. Thus, one might expect that using the onshore sensors for geomagnetic corrections would be effective in this frequency band. Theoretical models for internal wave induced magnetic spectra indicate that the amplitude increases with decreasing frequency most likely related to longer wavelength features. Previous model analysis (Avera, 2009) demonstrated that ocean dynamics could affect airborne magnetic measurements and showed that model predictions agreed with published analytic predictions.

BRIEF DESCRIPTION OF THE DRAWINGS

The present invention will now be described, by way of example, with reference to the accompanying figures, wherein:

FIG. 7 illustrates the residual magnetic field (black), and the predicted magnetic field based entirely on ADCP measurements (blue).

DESCRIPTION OF EXEMPLARY EMBODIMENTS OF THE INVENTION

The Coastal Mixing and Magnetics Project seeks to understand the extent to which direct measurement of ocean dynamics can reduce electromagnetic sensor noise. The research project is located at The South Florida Oceanographic Measurement Facility (SFOMF). SFOMF is an undersea test range in shallow water off the coast of Fort Lauderdale, operated by the Naval Surface Warfare Center, Carderock Division (NSWCCD).

The SFOMF facility contains a number of underwater sensors (e.g., mounted, or bottom-mounted, or moored sensors) connected to shore-based recording and processing facilities where the primary focus is to measure the signatures of naval vessels. The revitalized facilities include a wide variety of ocean and land-based fixed and mobile sensors to support Navy, academic, and commercial research; see, e.g., Venezia et al. 2003; Venezia 2010; Bradley et al. 2011; and, Dhanak et al. 2013.

The project objective of primary interest herein, along with the preliminary results described herein, is to test the present inventors' novel assertion that it is possible to reduce seawater motion-induced electromagnetic background noise using the output of an Acoustic Doppler Current Profiler as a cancellation algorithm reference. The Coastal Mixing and Magnetics research project also encompasses other objectives and experiments beyond the scope of this disclosure.

Soloviev et al. 2013, Avera et al. 2011, Nelson et al. 2013, and others disclose research on comparison of ocean-generated magnetic fields measurements in air and water versus that predicted from ocean circulation models. Generally, these predictions have been on a large scale; however, the present inventors inferred therefrom that a favorable result may be possible using a cancellation algorithm.

Experimentation conducted by the present inventors used the following subset of the SFOMF sensor suites: five Helium$^3$ (He$^3$) low-power magnetometers from the Office of Naval Research Deployable Autonomous Distributed System (DADS); three 150 kilohertz (khz) Nortek Aquadrop Current Profilers, Acoustic Doppler Current Profilers (ADCPs); and, two shore-based Geometrics G823 total-field magnetometers.

Figure 1:
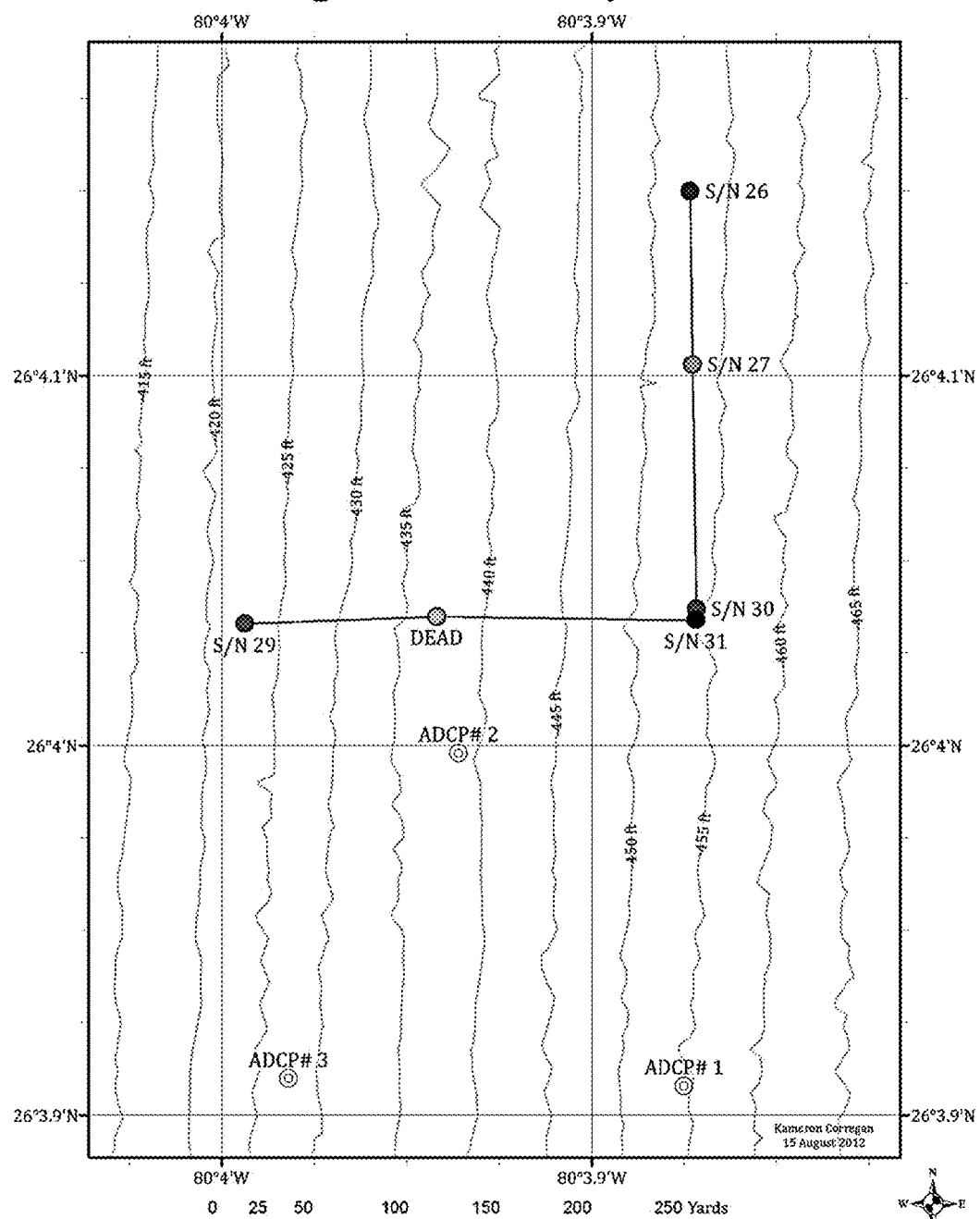
FIG. 1 is a graph showing locations of magnetometers and ADCPs used in inventive testing.

These sensors cable to shore and collect long-term water velocity and magnetic data sets. We now consider one short data set. This data set exemplifies data acquisition and provides a glimpse at the sensors, data processing, and modeling. Analysis options focusing on noise reduction is given. FIG. 1 is a chart of the sensor deployment. FIG. 1 shows locations of the three ADCPs and the two magnetometers (Unit #29 and Unit #31) used in this analysis.

The data collection from 1700 Local Time (LT) 7 January through 0900, LT time 9 Jan. 2013 contained good data from three ADCP sensors, five undersea magnetometers, and both onshore magnetometers. The instant disclosure deals primarily with this data set.

Data processing may be performed. First, the magnetic data is inspected for missing data points, time jumps, glitches, sensor failure, etc. This data chosen consisted of the two offshore magnetic sensors (#29 and #31) and two onshore magnetic sensors (#1 and #2). The onshore magnetometers did have some small single-data-point glitches and showed some periods where there was noise at about ~1 nanotesla (nT) in amplitude, with a period of ~1.5 seconds (sec).

The timestamp on the undersea magnetic data and ADCP data came from the SFOMF main data recording system marked with global positioning system (GPS) time. However, the timestamp on the onshore magnetic sensors came from a stand-alone data acquisition computer, which was not set to a standard time source (GPS or coordinated universal time (UTC)). The present inventors assumed that the undersea magnetometer and ADCP data had the correct time stamp and that the onshore magnetometer timestamp was off by a constant number of seconds.

The onshore magnetic data was sampled at 10 Hz and the offshore magnetic data sampled at ~5.8 Hz. To compare the onshore and undersea magnetic data, it was necessary to re-sample them to a common sampling rate. Each were low-pass filtered at 0.1 Hz with a $4^{th}$-order digital Butterworth filter applied in both the forward and backward directions, which resulted in an $8^{th}$-order, zero-phase Butterworth filter. Both sub-sampled to 1 Hz, starting and ending at the times shown above.

To correct the onshore timestamp, the onshore and undersea data were first band-pass filtered with a 0.001-0.1 Hz $4^{th}$-order Butterworth filter, then correlated to identify the correct lag (number of seconds) between the onshore and undersea magnetometer data. The lag was found and the onshore magnetic timestamp data was adjusted to match the undersea and ADCP timestamps.

Briefly described hereinbelow are efforts underway under the Coastal Mixing and Magnetic Project. The data analysis and results presented hereinbelow are preliminary.

The first data analysis effort is to reduce the ADCP data in a way that identifies distinct oceanic features. These features may correlate well with magnetometer responses. Knowing what distinct ocean features are present will allow a closed form modeled magnetometer response. Using ADCP water velocity data, an approximation of the stream function, $\psi$, is calculated by the method of Moum and Smyth [15], where c represents the speed of the internal wave, and u and v are the horizontal and vertical components of water velocity, respectively. Subscripts denote partial derivatives.

$$u = \psi_z \tag{1}$$

$$v = -\psi_x \tag{2}$$

$$\psi = \int_0^z (u-c)dz \tag{3}$$

The present inventors assumed that waves passing the measurement location were inviscid and did not change shape during the data collection. Therefore, in the wave's reference frame, the calculated streamlines run along the isopycnals (i.e., are equivalent to the isopycnal displacement, η); see Moum et al.

The inverse scattering transform is capable of separating a nonlinear signal into its individual nonlinear components for analysis. The time series data converts to frequency space through the solution of the direct scattering problem (i.e., the Schrödinger eigenvalue problem).

$$\psi_{tt} + [\lambda \eta + \omega^2]\psi = 0 \tag{4}$$

$$\lambda = \frac{\alpha c^2}{6\beta} \tag{5}$$

In the equations above, λ represents the nonlinearity-to-dispersion ratio of the internal wave, w is the frequency in Hz, and the α and β terms are constants derived from KdV theory; see Osborne. The solution of this problem required the calculation of a numerical approximation to the monodromy matrix. The monodromy matrix appears during Floquet analysis. It maps the set of basis functions (eigenfunctions) from the current period to the next period; therefore, this analysis requires that the data are periodic with period T. T must be large enough to ensure that this analysis is valid without adversely affecting the data through the artificially imposed periodicity.

The numerical approximation to the monodromy matrix is the scattering matrix, M. M is given below. The matrix, ϕ, contains information about the basis functions.

$$\Phi(t+T; t_0, \omega) = M(t_0, \omega)\Phi(t; t_0, \omega) \tag{6}$$

$$M = \prod_{n=M-t}^{0} T(\eta_n, \Delta t) \tag{7}$$

$$T = \begin{pmatrix} \cos(\kappa \Delta t) & \frac{\sin(\kappa \Delta t)}{\kappa} \\ -\kappa \sin(\kappa \Delta t) & \cos(\kappa \Delta t) \end{pmatrix} \tag{8}$$

$$\kappa = \sqrt{\lambda \eta + \omega^2} \tag{9}$$

Using the method proposed by Osborne, the amplitudes and phases (known as Riemann data) of the cnoidal waves were calculated from the components of the monodromy matrix. Once the time series data is transformed into frequency space, the soliton components of the signal can be isolated. These components distort the magnetic field in the area. A MATLAB numerical algorithm to complete this analysis is under construction.

The second data analysis effort is to use a direct correlation of the ADCP velocity data, properly scaled, to reduce the magnetometer data noise.

The Navy is currently developing a methodology that includes magnetometer data but does not include ADCP data. This method reduces in-water magnetometer noise using the shore side (base station) reference magnetometers. Consider the following wherein: $B_1$ is the base station magnetometer #1 time series; $B_2$ is the base station magnetometer #2 time series; and, $H_1$ is the offshore magnetometer time series. The terms in the matrices below represent a value at the one-second sampling rate.

$$B_1 = \begin{vmatrix} b_{11} \\ b_{21} \\ b_{31} \\ b_{41} \\ \vdots \\ b_{n1} \end{vmatrix}, B_2 = \begin{vmatrix} b_{12} \\ b_{22} \\ b_{32} \\ b_{42} \\ \vdots \\ b_{n2} \end{vmatrix}, B = \begin{vmatrix} b_{11} & b_{12} \\ b_{21} & b_{22} \\ b_{31} & b_{32} \\ b_{41} & b_{42} \\ \vdots & \vdots \\ b_{n1} & b_{n2} \end{vmatrix} \text{ and } H_1 = \begin{vmatrix} h_1 \\ h_2 \\ h_3 \\ h_4 \\ \vdots \\ h_n \end{vmatrix} \quad (10)$$

$$\sum_n (H_1 - S \cdot B)^2 = \min \quad (11)$$

$$S = (B^T B)^{-1} B^T H_1 \quad (12)$$

The above-described method involves a direct one-for-one subtraction, using the shore station, to correct the noise in the offshore magnetometer. That is, the lower noise value or difference $d_i$ is given by $$d_i = H_i - (S \cdot B_i),$$

where S is equal to 1;

$B_i$ is the i-th row and j-th column of a matrix B.

In inventive principle, if the ADCP velocities correlate with the magnetometer noise, a similar methodology to reduce the in-water magnetometer data may apply.

The present inventors find that better noise reduction methodology may be possible using a mathematical technique of least squares. According to inventive principle, a matrix S may be sought that minimizes the error between the onshore and offshore magnetometers. Also according to inventive principle, an adaptive noise cancellation based on an ADCP can follow the same logic. Requiring the least squared error E to be a minimum with respect to S, where $T_0$ is an appropriate integrated water column ADCP time series, we may find S given by:

$$E = \frac{\partial}{\partial S} \int \{[H_1(t)]^2 - H_1(t)T_0(t)S + T_0^2(t)S^2\} dt \quad (13)$$

$$E = \frac{\partial}{\partial S} \int -H_1(t)T_0(t)S dt + \frac{\partial}{\partial S} \int T_0^2(t)S^2 dt \quad (14)$$

$$S = \frac{\int H_1(t)T_0(t) dt}{\int T_0^2(t) dt} \quad (15)$$

For this inventive method, the data reduction has started and the initial results are promising. The extent to which the magnetic noise cancelation is possible using the ADCP data and the inventive methodology is still under determination by the present inventors. There remains a question as to where in the ADCP column of data the practitioner should apply the inventive methodology. An alternative approach would be for the inventive practitioner to use some weighted average of the components of water velocity. To make the best choices in these aspects of inventive practice, knowledge of how and where the water velocities affect the electric and magnetic fields should be incorporated into the inventive solution. Furthermore, the present inventors have also given consideration to formulating a different inventive methodology of noise reduction, whereby ADCP and magnetometer data are more intimately combined.

Figure 2A:
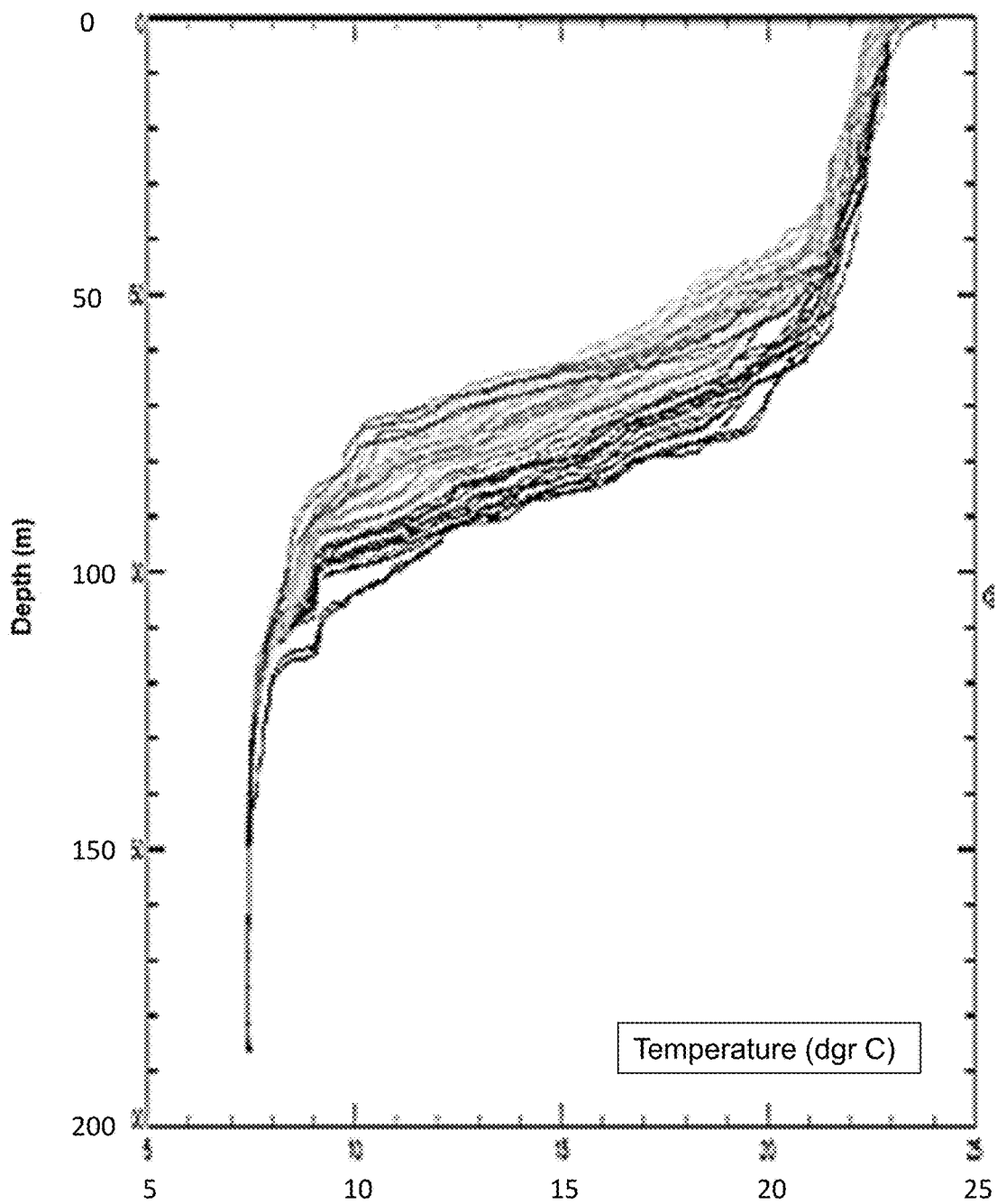
FIGS. 2A and 2B are graphs showing temperature data and conductivity data, respectively, in accordance with water depth.
Figure 2B:
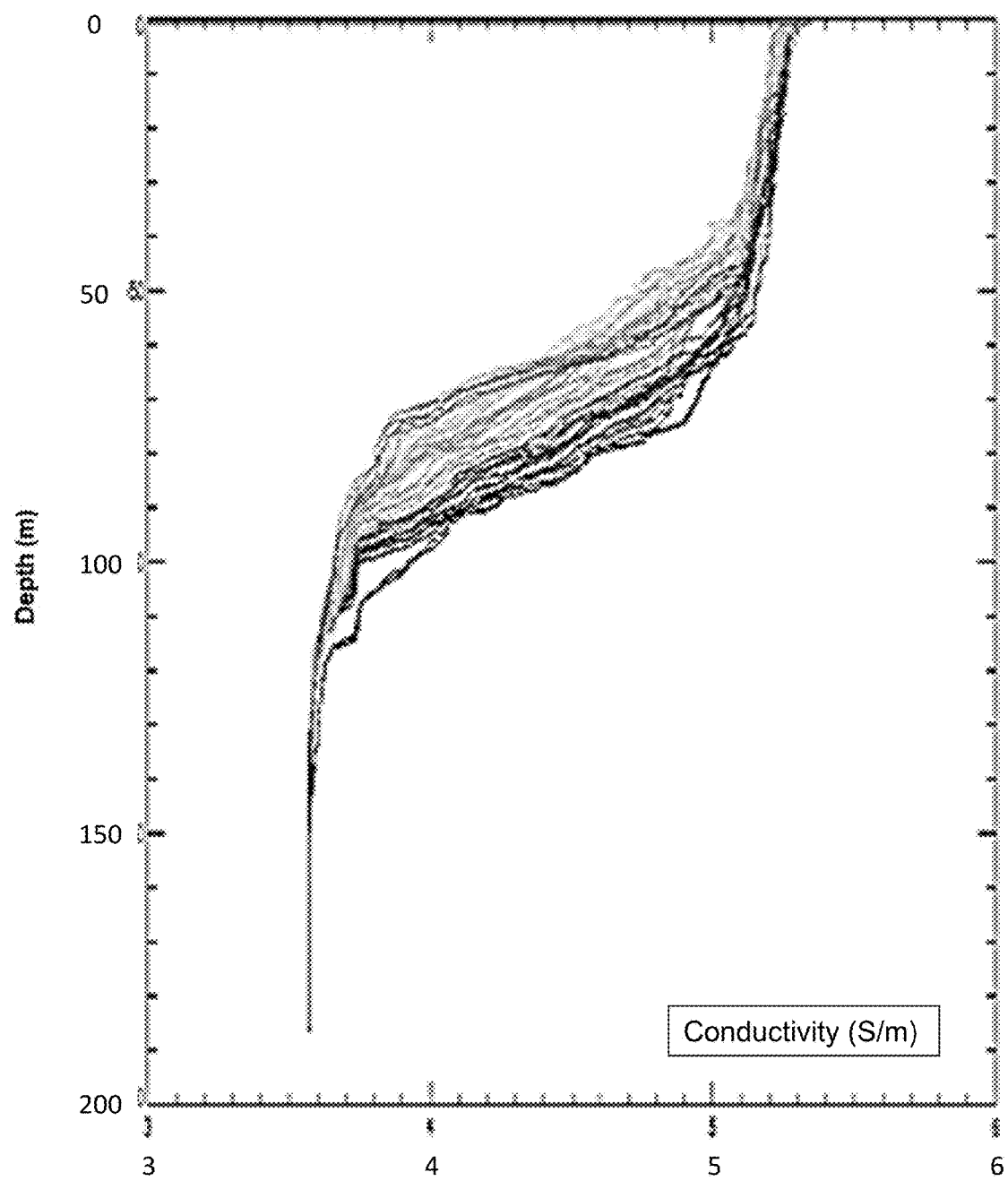

Consider now some feature extraction from the ADCP and magnetometer data. There appears to be a change in character of the velocity field at a depth of ~100 meters (m). We do not have temperature or salinity data from Jan. 8-9, 2013 but do have conductivity and temperature profiles from January 2011, which clearly show a change in character near 100 m depth (FIG. 2A and FIG. 2B). FIGS. 2A and 2B show CTD casts on 23 Jan. 2011 over the test site. Therefore, there may be significant stratification of the water properties near 100 m depth, and there might be propagating internal wave disturbances near this interface.

In previous analysis of SFOMF data (Dhanak et al.), it was shown that there was very little coast-line effect on the magnetic signals; i.e., there was very little change in amplitude or phase between the geomagnetic signals measured with the onshore magnetometers, versus those measured with the undersea magnetometers. This suggests that a simple data point for data point subtraction works just as well, for geomagnetic noise reduction, as more complicated frequency-domain analyses that take account of amplitude and phase changes at each frequency.

Figure 3:
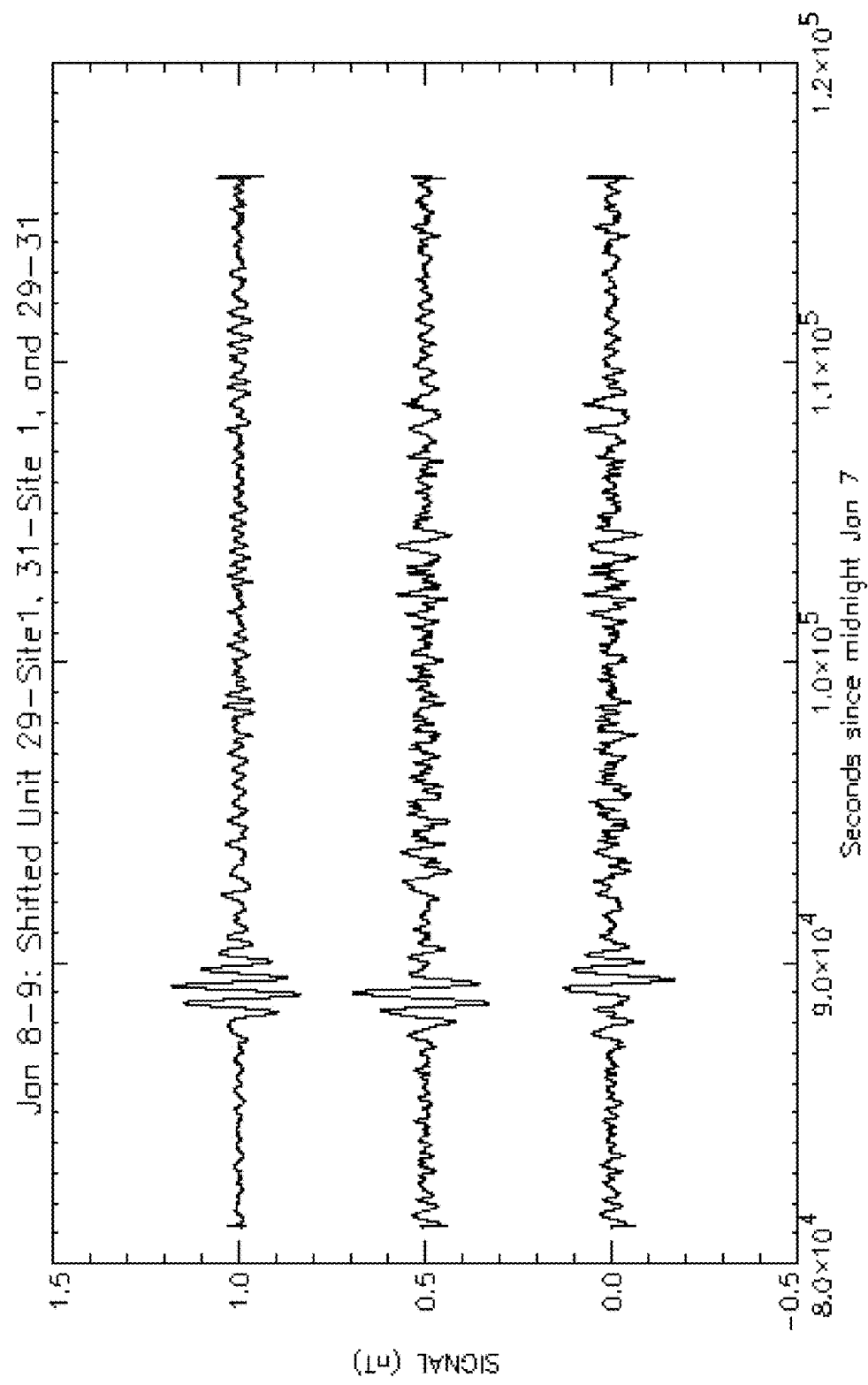
FIG. 3 is a graph showing magnetic signals for onshore magnetometers, magnetic signals for undersea magnetometers, and subtraction of these two sets of magnetic signals.

Therefore, in the analysis that follows, onshore signals were simply subtracted from the undersea magnetic signals. FIG. 3 shows these three quantities for the portion of the data under consideration (80,000-116,000 seconds, or 600 minutes or 10 hours). FIG. 3 illustrates Result sensor #29 (black), Result sensor #31 (blue), and Result sensor #29 minus Result sensor #31 (red).

If the event is truly a propagating ocean disturbance like a wave packet, then Result sensor #29 (black) and Result sensor #31 (blue) should be very similar in shape and amplitude. Clearly, the two patterns are very similar, which is strong evidence that the event is really an ocean disturbance that propagates across the two undersea sensors during a time of 750 seconds. The speed of westward propagation is approximately 0.33 meters per second (m/s) or 0.64 knots in the westward direction.

Figure 4:
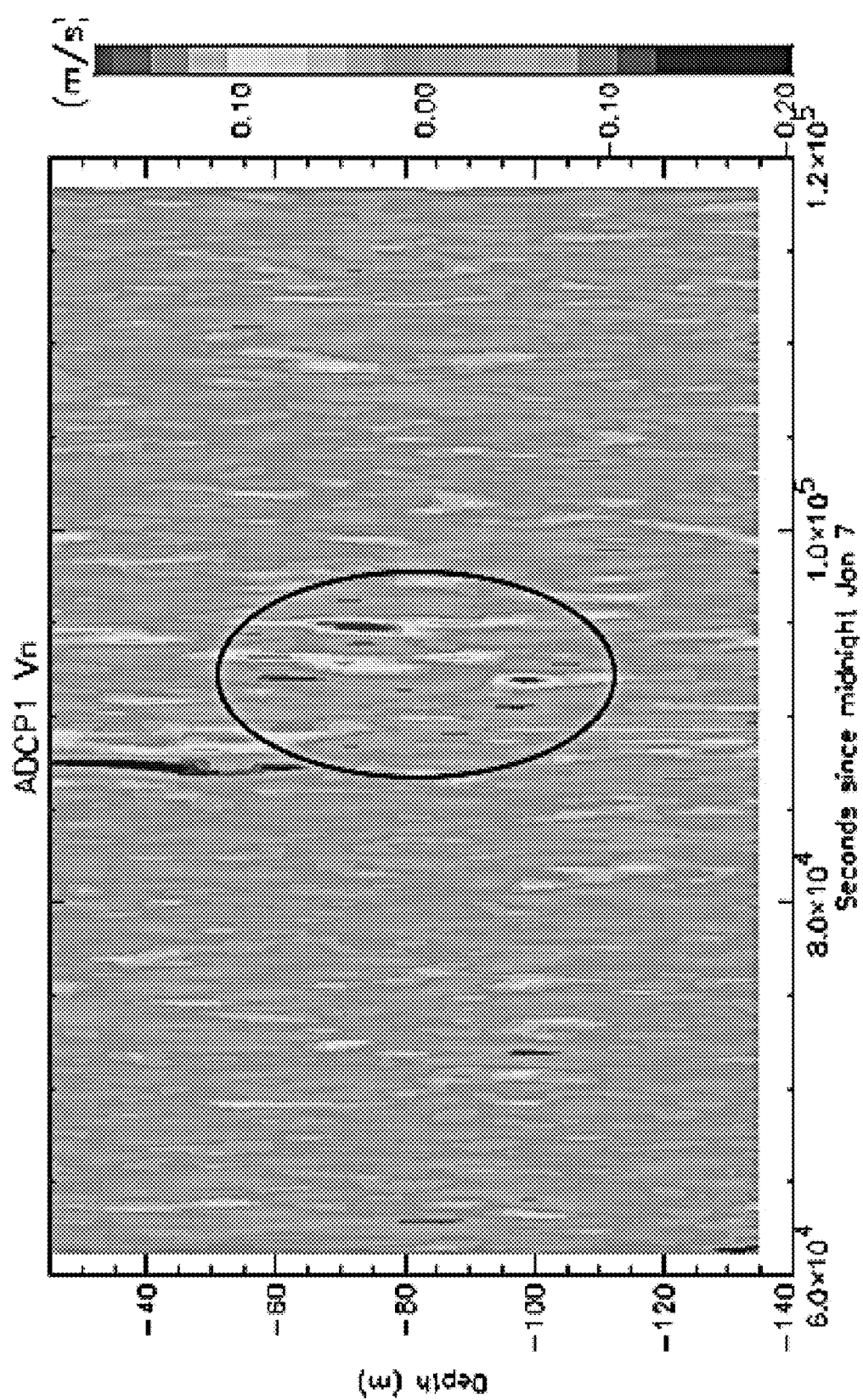
FIGS. 4, 5, and 6 are graphs showing three respective kinds of velocity data for a single ADCP.
Figure 5:
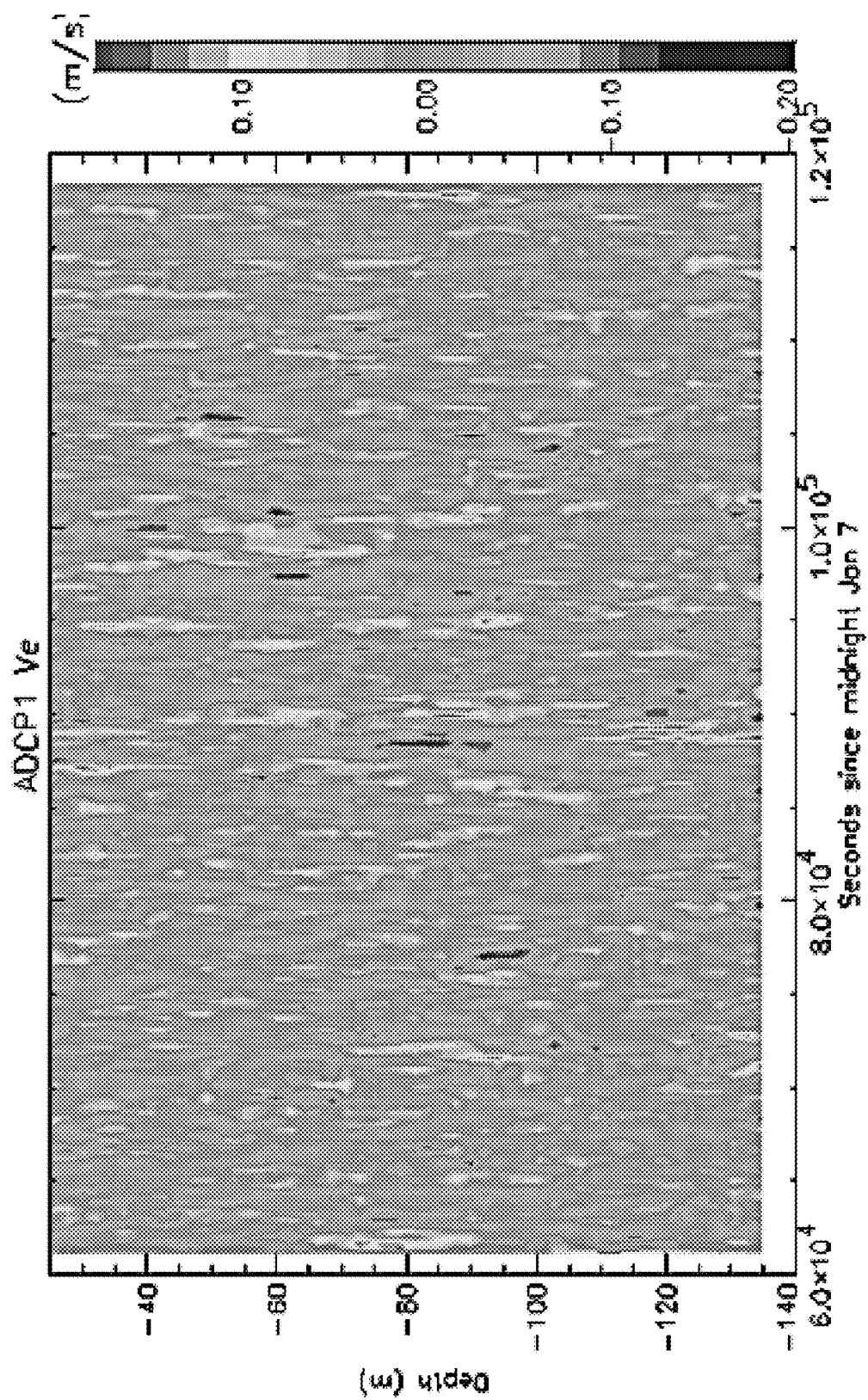
Figure 6:
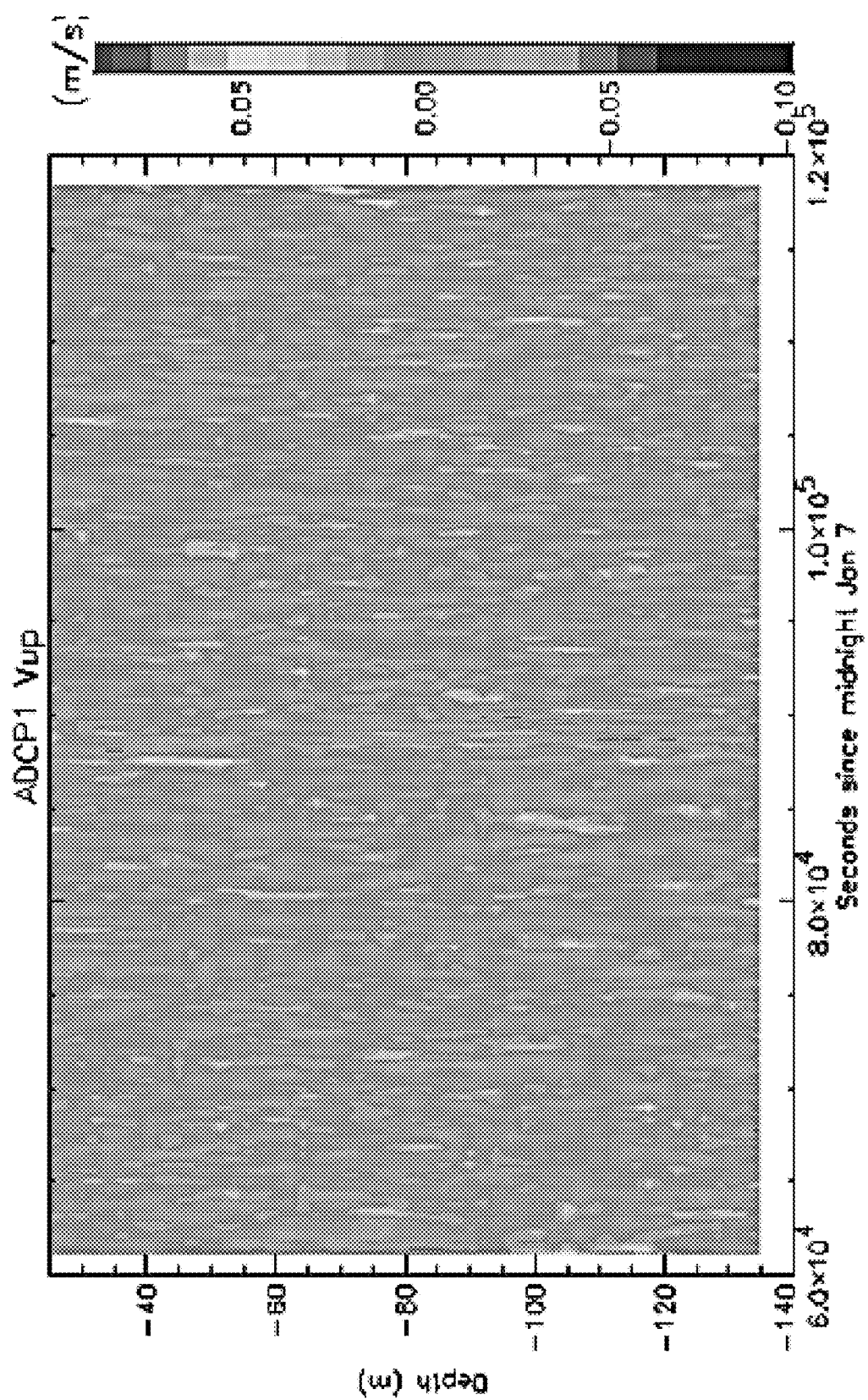

FIGS. 4 through 6 show the Vn, Ve, and Vup velocity data for one of the three ADCPs. FIG. 4 illustrates Vn for ADCPI (Filtered to remove frequencies >55 minutes). In FIG. 4, the oscillatory pattern is highlighted with the black oval. FIG. 5 illustrates Ve for ADCPI (Filtered to remove frequencies >55 minutes). FIG. 6 illustrates Vup for ADCPI (Filtered to remove frequencies >55 minutes).

There are clear oscillatory patterns evident in all Vn data between 88,000 and 95,000 seconds, at depths ranging from −70 to −100 m (highlighted in FIG. 4 with the black oval). The oscillatory patterns are not as clear in the Ve and Vup data. The present inventors believe that these oscillatory velocities are evidence of a wave packet traveling along the stratification boundary and that they give rise to the magnetic signals seen in FIG. 3.

The total velocity $V = \sqrt{(Vn^2 + Ve^2 + Vup^2)}$ was calculated for each ADCP using only the signals with periods <55 minutes to determine if there was a clustering of high water velocity events that matched the magnetic events at similar times.

The ADCPs were not co-located with the magnetometers, so there will be shifting in time between the magnetic and ADCP events depending on which direction the water movement occurred; for instance, the separation of ADCPs and magnetometers was ~200 m, so if the propagation velocity was 0.2 m/s, this would result in a time shift of ~1000 seconds.

The square of the velocity captures the force or energy of the water in the event. When examined in this way the internal wave-like feature is evident in the ADCP data, as is the period just after the internal wave where there was a significant amount of ocean-generated magnetic variations.

The magnetic field can be predicted using ADCP data. The United States Naval Research Laboratory (NRL) has developed a model and technique to calculate magnetic fields from ocean flow using data acquired by an ADCP. In previous experiments, this technique helped to evaluate the influence of ocean dynamics on magnetic measurements; see Avera et al., and Nelson and Avara. The predicted magnetic field compares with the measured magnetometer observations. This result identifies and quantifies the magnetic noise generated from ocean dynamics.

The NRL prediction model is dependent on a layered EM calculation using a flat bottom. The predictive model works with a three-dimensional (3-D) grid of cells from a high-resolution ocean flow model. To use the SFOMF ADCP configuration together in the magnetic prediction model, a 3-D model of ocean cells must to be constructed and each ADCP must be interpolated to the 3-D cell structure between the measurement points and extending out to the boundaries of the ocean flow model. In its present development state, the EM model calculations require the ocean flow model to cover a 6 km×6 km horizontal extent.

Once the ocean flow model is constructed for each time period, the EM model produces a prediction of the magnetic field as a function of time. The water conductivity parameter needs a measure of the bottom conductivity and the locations for the magnetic prediction. The magnetic prediction is computed for a magnetic sensor (e.g., magnetometer) on the bottom and located in the center of the three ADCPs. The three ADCP are triangularly configured, and the magnetometer is approximately centrally located with respect to the three ADCPs, e.g., approximately equidistant from the three ADCPs. Since the ADCPs are ensemble averaged over 300 sec to produce one sample the magnetic predictions are for the 300 sec same time scale.

Figure 7:
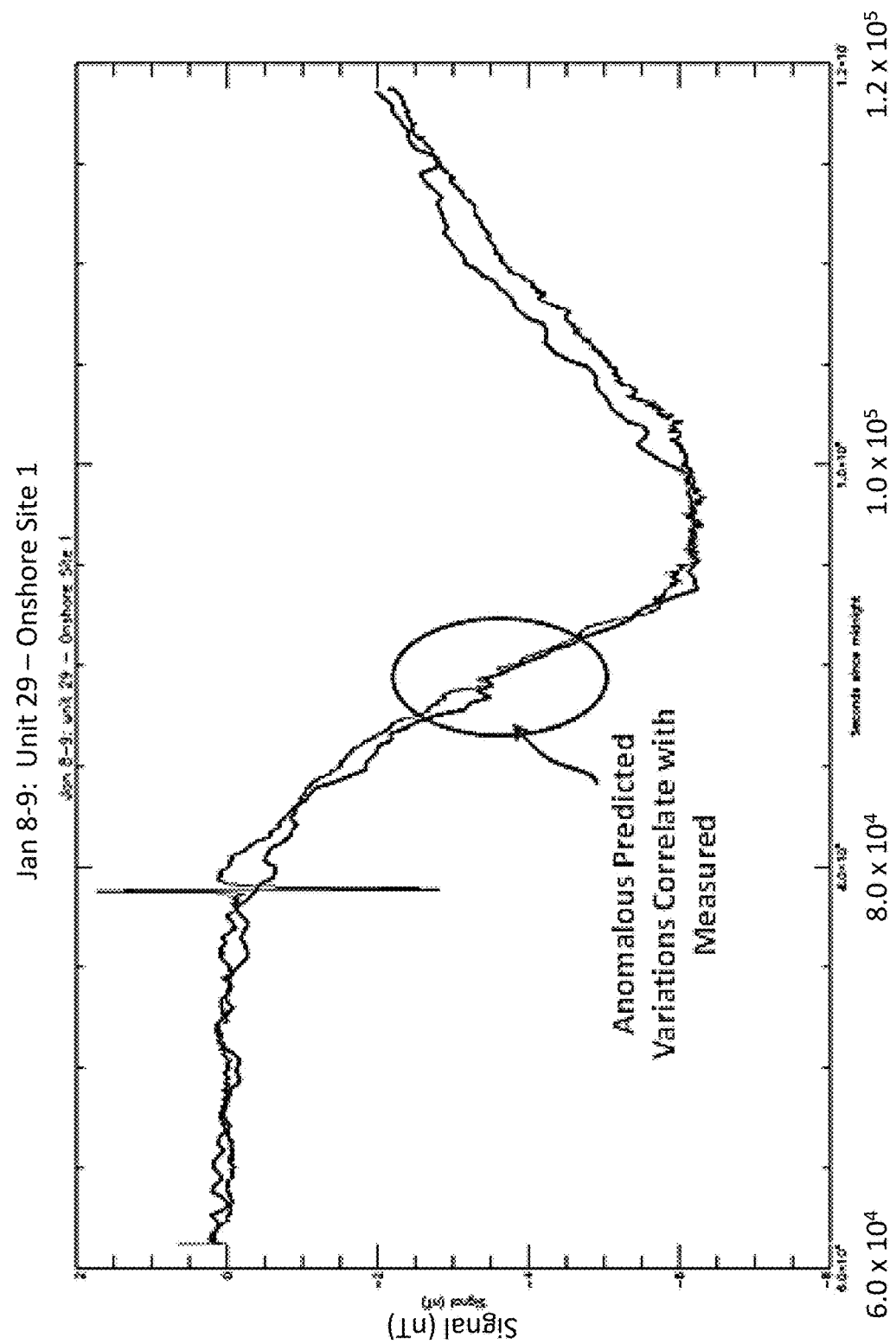
FIG. 7 is a graph showing (i) a residual magnetic field, based on subtraction of onshore and offshore magnetometer measurements; and (ii) a predicted magnetic field, based on ADCP measurements.

The results are shown in FIG. 7, with the residual magnetic field (offshore unit #29 subtracted from shore site #1) plotted in black, and the predicted magnetic field based entirely on ADCP measurements plotted in blue. The correlation of the ADCP-predicted magnetic field with the observed magnetic field reinforces the conclusion that the anomaly is due to ocean dynamics.

Understanding the stratification of the water column is important, and that data is lacking in the present work. Future experiments should include this measurement to know exactly where the water stratification occurs, to optimize the parameter selection for the ADCP's or other sensors at the site. The triangle array of ADCP sensor placement worked well for measuring ocean flow near the magnetometer array.

However, the physical separation of the ADCPs and the undersea magnetometers makes the inventive analysis difficult. The time required for oceanographic phenomena to move from the magnetic sensors to the existing ADCP field can be significant. In inventive testing, the ADCPs were set up to produce samples at a 300 sec interval. This is a low sample rate for some of the oceanographic features of interest (e.g. internal waves).

To support planning, development, and testing of future naval systems, a meaningful model capability and the best possible noise reduction methodologies are needed such that background magnetic and electric fields can be predicted from known measurements, past (historical) conditions, or new high resolution ocean flow models. The present inventors' combination of cabled ADCPs and magnetic sensors is an ideal model verification tool to explore models in different seasons and ocean conditions.

Based on the ADCP model alone, the magnetic prediction matched the observed magnetic deviation thought to be due to tides and corresponding to an observed magnetic residual anomaly detected in the undersea magnetometer measurements. This initial result can serve as a baseline for the model development effort.

The undersea magnetic data alone, and in particular the difference between undersea magnetic sensors, could auto-detect internal waves. The direction and speed of propagation can be determined from analysis of the magnetic data alone. The ADCP data may be analyzed to look for corroboration.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A computer-implemented method for conducting underwater electromagnetic field measurement, wherein said underwater electromagnetic field measurement is conducted so as to compensate for electromagnetic background noise associated with underwater oceanographic dynamics, the method comprising:

placing underwater at least one acoustic Doppler current profiler;

placing underwater at least one magnetometer;

obtaining acoustic Doppler current profiler time series data, said obtaining of said acoustic Doppler current profiler time series data including using said at least one acoustic Doppler current profiler;

obtaining magnetometer time series data, said obtaining of said magnetometer time series data including using said at least one magnetometer;

combining said acoustic Doppler current profiler time series data and said magnetometer time series data to reduce said electromagnetic background noise induced by water motion, wherein said combining of said acoustic Doppler current profiler time series data and said magnetometer time series data includes determining a least squares matrix for using said acoustic Doppler current profiler time series data as an algorithmic reference for effecting noise cancellation, wherein said least squares matrix minimizes a least squared error between said acoustic Doppler current profiler time series data and said magnetometer time series data.

2. The method for conducting underwater electromagnetic field measurement as recited in claim 1, wherein:

said at least one acoustic Doppler current profiler is at least three acoustic Doppler current profilers;

said at least three acoustic Doppler current profilers are arranged in a triangular configuration;

said at least one magnetometer is situated approximately centrally with respect to said at least three acoustic Doppler current profilers.

3. The method for conducting underwater electromagnetic field measurement as recited in claim 1, wherein said at least three acoustic Doppler current profilers and said at least one magnetometer are co-located.

4. The method for conducting underwater electromagnetic field measurement as recited in claim 1, wherein:

$$E = \frac{\partial}{\partial S}\int\{[H_1(t)]^2 - H_1(t)T_0(t)S + T_0^2(t)S^2\}dt;$$

$$E = \frac{\partial}{\partial S}\int -H_1(t)T_0(t)Sdt + \frac{\partial}{\partial S}\int T_0^2(t)S^2 dt;$$

$$S = \frac{\int H_1(t)T_0(t)dt}{\int T_0^2(t)dt};$$

S is said least squares matrix;
E is said least squares error;
$T_0$ is said acoustic Doppler current profiler time series data;
$H_1$ is said magnetometer time series data.

5. The method for conducting underwater electromagnetic field measurement as recited in claim 4, wherein:
said at least one acoustic Doppler current profiler is at least three acoustic Doppler current profilers;
said at least three acoustic Doppler current profilers are arranged in a triangular configuration;
said at least one magnetometer is situated approximately centrally with respect to said at least three acoustic Doppler current profilers.

6. The method for conducting underwater electromagnetic field measurement as recited in claim 4, wherein said at least three acoustic Doppler current profilers and said at least one magnetometer are co-located.

7. The method for conducting underwater electromagnetic field measurement as recited in claim 4, wherein said obtaining of said acoustic Doppler current profiler time series data, said obtaining of said magnetometer time series data, and said determining of said least squares matrix each include using a computer.

8. An apparatus for measuring underwater electromagnetic phenomena, wherein said measuring of said underwater electromagnetic phenomena is performed so as to compensate for electromagnetic background noise associated with underwater oceanographic dynamics, said apparatus comprising at least one acoustic Doppler current profiler, at least one magnetometer, and a computer, said computer having computer code characterized by computer program logic for enabling said computer to process underwater electromagnetic field measurement, said computer code being executable by said computer so that, in accordance with said computer program logic, said computer performs acts including:
inputting measurement data received from said at least one acoustic Doppler current profiler;
inputting measurement data received from said at least one magnetometer;
producing acoustic Doppler current profiler time series data, said producing of said acoustic Doppler current profiler time series data including using said measurement data received from said at least one acoustic Doppler current profiler;
producing magnetometer time series data, said producing of said magnetometer time series data including using said measurement data received from said at least one magnetometer;
combining said acoustic Doppler current profiler time series data and said magnetometer time series data to reduce said electromagnetic background noise induced by water motion, wherein said combining of said acoustic Doppler current profiler time series data and said magnetometer time series data includes performing a least squares calculation for using said acoustic Doppler current profiler time series data as an algorithmic reference for effecting noise cancellation, wherein a least squares matrix minimizes a least squared error between said acoustic Doppler current profiler time series data and said magnetometer time series data.

9. The apparatus for measuring underwater electromagnetic phenomena as recited in claim 8, wherein:
said at least one acoustic Doppler current profiler is at least three acoustic Doppler current profilers;
said at least three acoustic Doppler current profilers are arranged in a triangular configuration;
said at least one magnetometer is situated approximately centrally with respect to said at least three acoustic Doppler current profilers.

10. The apparatus for measuring underwater electromagnetic phenomena as recited in claim 8, wherein said at least three acoustic Doppler current profilers and said at least one magnetometer are co-located.

11. The apparatus for measuring underwater electromagnetic phenomena as recited in claim 8, wherein according to said least squares calculation:

$$E = \frac{\partial}{\partial S}\int\{[H_1(t)]^2 - H_1(t)T_0(t)S + T_0^2(t)S^2\}dt;$$

$$E = \frac{\partial}{\partial S}\int -H_1(t)T_0(t)Sdt + \frac{\partial}{\partial S}\int T_0^2(t)S^2 dt;$$

$$S = \frac{\int H_1(t)T_0(t)dt}{\int T_0^2(t)dt};$$

S is said least squares matrix;
E is said least squares error;
$T_0$ is said acoustic Doppler current profiler time series data;
$H_1$ is said magnetometer time series data.

12. The apparatus for measuring underwater electromagnetic phenomena as recited in claim 11, wherein:
said at least one acoustic Doppler current profiler is at least three acoustic Doppler current profilers;
said at least three acoustic Doppler current profilers are arranged in a triangular configuration;
said at least one magnetometer is situated approximately centrally with respect to said at least three acoustic Doppler current profilers.

13. The apparatus for measuring underwater electromagnetic phenomena as recited in claim 11, wherein said at least three acoustic Doppler current profilers and said at least one magnetometer are co-located.

* * * * *